(12) United States Patent
Yun

(10) Patent No.: US 8,663,061 B2
(45) Date of Patent: Mar. 4, 2014

(54) SHIFTING CONTROL METHOD OF HYBRID VEHICLE

(75) Inventor: Seok Young Yun, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 190 days.

(21) Appl. No.: 13/190,332

(22) Filed: Jul. 25, 2011

(65) Prior Publication Data

US 2012/0142490 A1    Jun. 7, 2012

(30) Foreign Application Priority Data

Dec. 6, 2010  (KR) .................. 10-2010-0123585

(51) Int. Cl.
| B60W 10/02 | (2006.01) |
| B60W 10/04 | (2006.01) |
| F16H 3/72 | (2006.01) |
| B60K 6/20 | (2007.10) |

(52) U.S. Cl.
USPC ................ 477/5; 477/116; 180/65.21; 475/5; 903/910

(58) Field of Classification Search
USPC ...................................... 477/5, 116
See application file for complete search history.

(56) References Cited

U.S. PATENT DOCUMENTS

| 5,931,757 | A * | 8/1999 | Schmidt ............................ 475/2 |
| 6,625,524 | B2 * | 9/2003 | Yamaguchi et al. ............. 701/22 |
| 7,530,920 | B2 * | 5/2009 | Matsubara et al. ............... 477/3 |
| 2004/0192494 | A1 * | 9/2004 | Ozeki et al. ........................ 477/3 |
| 2006/0189428 | A1 * | 8/2006 | Raghavan et al. ................. 475/5 |
| 2009/0118094 | A1 * | 5/2009 | Hsieh et al. .................... 477/110 |
| 2010/0227722 | A1 * | 9/2010 | Conlon .............. 475/5 |
| 2012/0142489 | A1 * | 6/2012 | Kim ................................. 477/3 |
| 2012/0143415 | A1 * | 6/2012 | Park ............................. 701/22 |
| 2012/0143421 | A1 * | 6/2012 | Park ............................. 701/22 |
| 2013/0006459 | A1 * | 1/2013 | Kim et al. ....................... 701/22 |
| 2013/0041533 | A1 * | 2/2013 | Kim ................. 701/22 |
| 2013/0142488 | A1 * | 6/2013 | De Laat et al. ................. 385/77 |

FOREIGN PATENT DOCUMENTS

| JP | 2005-351459 A | 12/2005 |
| JP | 4135672 B2 | 6/2008 |
| JP | 2010-143281 A | 7/2010 |
| KR | 10-2010-0088226 A | 8/2010 |

* cited by examiner

*Primary Examiner* — David D Le
*Assistant Examiner* — Colby M Hansen
(74) *Attorney, Agent, or Firm* — Morgan, Lewis & Bockius LLP

(57) ABSTRACT

A gear shifting method of a hybrid vehicle may include releasing a clutch and brake of a transmission and determining a neutral condition status, controlling torque of an engine connected to one operational element of a first planetary gear set in a neutral condition, and controlling speed of a first motor/generator connected to the other operational element of the first planetary gear set. Accordingly, a speed of the first and second motor/generator are controlled and a torque of the engine is controlled in a neutral or parking state of a shift lever such that a mode change becomes easy and the torque of the engine is continuously controlled to improve a shift quality and a driving performance and to save fuel, while the neutral or parking state is changed to a drive or reverse state or the drive or reverse state is changed to the neutral or parking state.

4 Claims, 8 Drawing Sheets

EVT1(BK2 operation)

EVT2(CL2 operation)

FIG. 4 (Prior Art)

| Conventional | N or P |
|---|---|
| Engine | Idle speed control |
| MG1 | Speed control |
| MG2 | Torque control |

FIG. 5

| This invention | N or P | EVT1 | EVT2 |
|---|---|---|---|
| Engine | Torque control | Torque control | Torque control |
| MG1 | Speed control | Speed control | Speed control |
| MG2 | Speed control | Torque control | Torque control |

SHIFTING CONTROL METHOD OF HYBRID VEHICLE

CROSS-REFERENCE TO RELATED APPLICATION

This application claims priority to and the benefit of Korean Patent Application No. 10-2010-0123585 filed Dec. 6, 2010, the entire contents of which application is incorporated herein for all purposes by this reference.

BACKGROUND OF INVENTION

1. Field of Invention

The present invention relates to a gear shifting method of a hybrid vehicle that combines an engine and a motor to generate a rotation torque and to transfer the rotation torque to an output shaft through a transmission.

2. Description of Related Art

Generally, an automatic transmission uses a hydraulic pressure to shift gear in a multi steps so as to output appropriate torque from a rotation torque of an engine/motor according to a driving condition.

One type of hybrid vehicles uses two motor/generators (MG) and one engine that are connected through a planetary gear and controls the motor/generator to achieve a continuous variable shifting.

Meanwhile, clutches and brakes are released so as to prevent a torque from being transferred to an output shaft of the transmission in a parking (P) or neutral (N) condition.

When it is transferred from a parking or neutral condition of a transmission to a drive (D) or reverse (R), slip is formed in the clutch and the brake by a rotation speed difference such that vibration/noise is formed by the frictional force and the durability of the transmission is decreased.

FIG. 4 is a table showing a gear shifting method of a conventional hybrid vehicle.

Referring to FIG. 4, an engine is controlled in an idle speed in a neutral (N) or parking (P). In other words, output torque of the engine is controlled according to an idle target speed. Further, a speed of the first motor/generator is controlled so as to prepare an EVT1 mode or an EVT2 mode for a next drive (D) or reverse (R) and an output torque of the second motor/generator is controlled for charging and discharging according to a target torque.

Meanwhile, since an engine is controlled to have an idle target speed in a neutral or parking state and an engine is controlled to output a predetermined torque in a driver or reverse state, there is a problem that a shift shock is generated and fuel consumption is increased.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a gear shifting method of a hybrid vehicle having advantages of reducing vibration/noise that is generated while an engine is changed to a torque control from a speed control and saving fuel while a transmission is changed to a drive or reverse from a parking or neutral.

A gear shifting method of a hybrid vehicle according to various aspects of the present invention may include releasing clutch and brake of a transmission and determining whether a neutral condition is or not, controlling torque of an engine connected to one operational element of a first planetary gear set in a neutral condition, and controlling speed of a first motor/generator connected to the other operational element of the first planetary gear set.

A second planetary gear set is disposed at one side of the first planetary gear set and a speed of a second motor/generator that is connected to one operational element of the second planetary gear set is controlled. A torque of the engine is controlled, a speed of the first motor/generator is controlled, and a torque of the second motor/generator is controlled in an EVT1 mode that the second ring gear of the second planetary gear set is fixed.

A torque of the engine is controlled, a speed of the first motor/generator is controlled, and a torque of the second motor/generator is controlled in an EVT2 mode that a speed of the second ring gear of the second planetary gear set is controlled to be equal to that of the rotation speed of the engine.

As stated above, in a gear shifting method of a hybrid vehicle according to the present invention, a torque of the engine is controlled and a speed of the first and second motor/generator is controlled in a parking or neutral state such that a shift shock is minimized and fuel consumption is reduced.

That is, a speed of the first and second motor/generator are controlled and a torque of the engine is controlled in a neutral or parking state of a shift lever such that a mode change becomes easy and the torque of the engine is continuously controlled to improve a shift quality and a driving performance and to save fuel, while the neutral or parking state is changed to a drive or reverse state or the drive or reverse state is changed to the neutral or parking state.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 is a table showing a conventional gear shifting method of a hybrid vehicle.

FIG. 5 is a table showing an exemplary gear shifting method of a hybrid vehicle according to the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
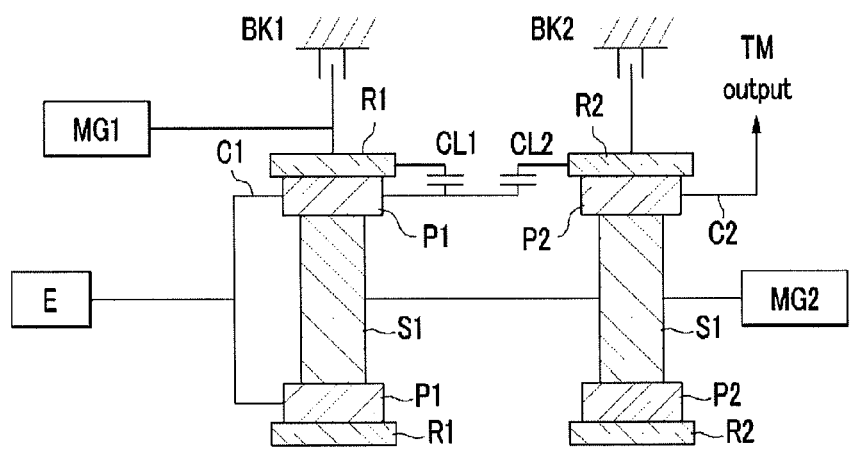
FIG. 1 is a schematic diagram of an exemplary shift system of a hybrid vehicle according to the present invention.

Referring to FIG. 1, a gear shifting system of a hybrid vehicle includes an engine (E), a first planetary gear unit, a second planetary gear unit, a first motor/generator MG1, a second motor/generator MG2, a first clutch CL1, a second clutch CL2, a first brake BK1, a second brake BK2, and a transmission output shaft (TM output).

The first planetary gear unit includes a first sun gear S1 in a center thereof, first pinion gears P1 that are externally meshed with the first sun gear S1, and a first ring gear R1 that the first pinion gears P1 are internally meshed therewith, wherein the first carrier C1 connects the first pinion gears P1 to rotate centering around the first sun gear S1.

The second planetary gear unit includes a second sun gear S2 in a center of thereof, second pinion gears P2 that are externally meshed with the second sun gear S2, and a second ring gear R2 that the second pinion gears P2 are internally meshed therewith, wherein the second carrier C2 connects the second pinion gears P2 to rotate centering around the second sun gear S2.

An output shaft of the engine (E) is connected to the first carrier C1 and the engine (E) rotates the first carrier C1 centering around the first sun gear S1.

The first motor/generator MG1 is disposed to rotate the first ring gear R1. Further, the first brake BK1 is disposed to selectively brake (stop) the first ring gear R1.

The first sun gear S1 and the second sun gear S2 are connected by one shaft to rotate together and the second motor/generator MG2 is disposed to rotate the second sun gear S2.

The first clutch CL1 selectively connects the first carrier C1 with the first ring gear R1 such that they rotate or stop together and the second clutch CL2 selectively connects the first carrier C1 with the second ring gear R2 such that they rotate or stop together.

The second brake BK2 is fixed to selectively brake the second ring gear R2. Further, the second carrier C2 is connected to an output shaft (TM output) of a transmission to a torque of the engine (E), the first motor/generator MG1, and the second motor/generator MG2 to a wheel.

Figure 2:
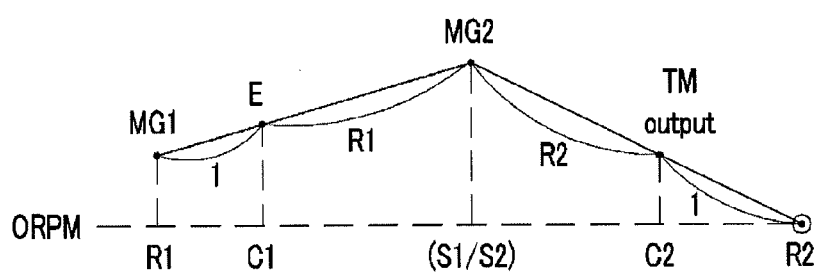
FIG. 2 is a speed diagram showing an EVT1 mode and EVT2 mode in an exemplary gear shifting method of a hybrid vehicle according to the present invention.
Figure 2:
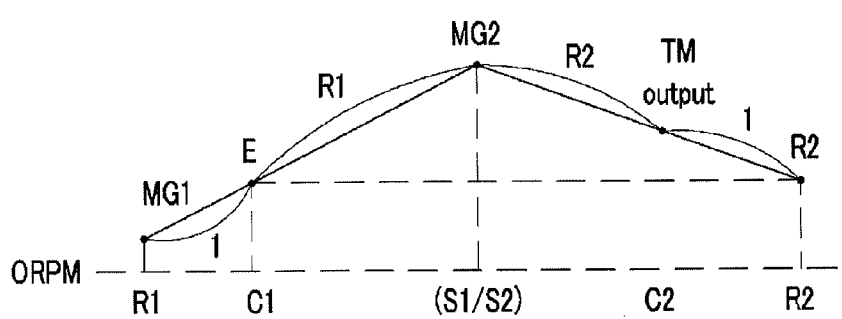

Referring to an upper side speed diagram of FIG. 2, the transmission of the hybrid vehicle performs an electronic variable transmission (EVT) mode, in this case, an EVT1 mode in a predetermined condition (D or R).

As shown, referring to a speed diagram for the EVT1, the first ring gear R1, the first carrier C1, the first and second sun gear S1 and S2, the second carrier C2, and the second ring gear R2 are disposed on a horizontal axis according to a predetermined gear ratio.

The first motor/generator MG1, the engine (E), and the second motor/generator MG2 are disposed on a line to form a predetermined speed line and the second motor/generator MG2, the output shaft (TM output), and the second ring gear R2 are disposed on a line to form a predetermined speed line.

In the EVT1 mode, the first brake BK2 is operated, other brake and clutch are released, and the second ring gear R2 is braked. However, the transmission output shaft (TM output) has a low speed by the first motor/generator MG1, the engine (E), and the second motor/generator MG2.

Referring to a lower side speed diagram of FIG. 2, the transmission of the hybrid vehicle performs an EVT2 mode in a predetermined condition (D or R).

As shown, referring to a speed line diagram for the EVT2, the first ring gear R1, the first carrier C1, the first and second sun gear S1 and S2, the second carrier C2, and the second ring gear R2 are disposed on a horizontal axis according to a predetermined gear ratio.

The first motor/generator MG1, the engine (E), and the second motor/generator MG2 are disposed on a line to form a predetermined speed line and the second motor/generator MG2, the output shaft (TM output), and the second ring gear R2 are disposed on a line to form a predetermined speed line.

The second clutch CL2 is operated and the other brake and clutch are released in the EVT2 mode and a rotation speed of the engine (E) is controlled to be equal to that of the second ring gear R2. However, the output shaft (TM output) has a predetermined high speed by the first motor/generator MG1, the engine (E), and the second motor/generator MG2.

Figure 3:
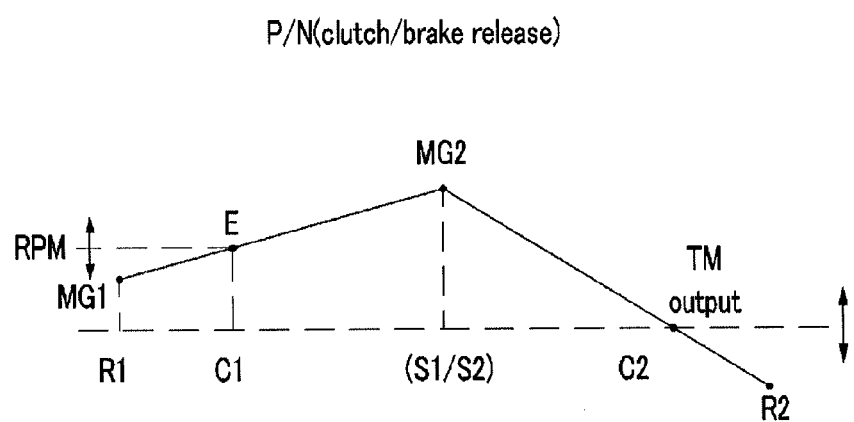
FIG. 3 is a speed diagram showing a parking/neutral state in an exemplary gear shifting method of a hybrid vehicle according to the present invention.

Referring to FIG. 3, if a parking or neutral is demanded, the transmission releases all clutches and brakes so as to perform parking (P) or neutral (N).

As shown, referring to a speed diagram for a parking or neutral condition, the first ring gear R1, the first carrier C1, the first and second sun gear S1 and S2, the second carrier C2, and the second ring gear R2 is disposed on a horizontal axis according to a predetermined gear ratio.

The first motor/generator MG1, the engine (E), and the second motor/generator MG2 forms a predetermined speed along one line and the second motor/generator MG2, the output shaft (TM output), and the second ring gear R2 forms a predetermined speed alone one line.

In a parking/neutral mode, all clutches and brakes are released, the output shaft (TM output) rotates according to a speed of the vehicle, the engine (E) is controlled to output a predetermined torque, and the first and second motor/generator MG1 and MG2 are controlled to output a predetermined speed.

Referring to FIG. 5, in a neutral or parking state, the engine is feed back or feed forward controlled to output a target torque and the first and second motor/generator is controlled to output a predetermined speed.

Further, in the EVT1 mode of the drive or reverse, the engine (E) is controlled to output a target torque, the first motor/generator MG1 is controlled to output a predetermined speed, and the second motor/generator MG2 is charged or discharged according to a target charging torque.

In addition, in the EVT2 mode of the drive or reverse, the engine (E) is controlled to output a target torque, the first motor/generator MG1 is controlled to output a predetermined speed, and the second motor/generator MG2 is charged or discharged according to a target charging torque.

Figure 6:
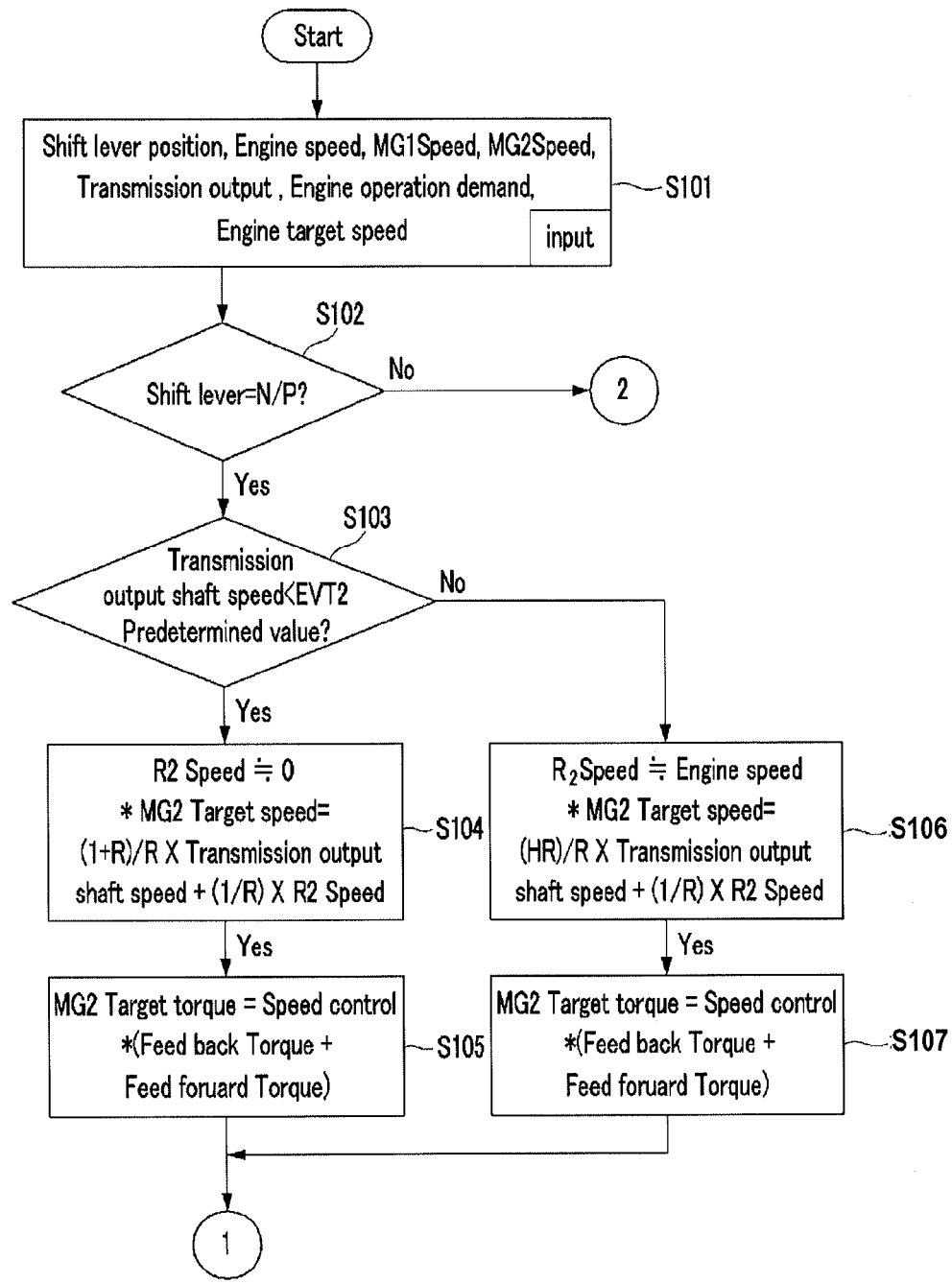
FIG. 6, FIG. 7, and FIG. 8 are flowcharts showing an exemplary gear shifting method of a hybrid vehicle according to the present invention.

Referring to FIG. 6, a control is stated and a shift lever position, an engine (E) speed, a speed of the first motor/generator MG1, a speed of the second motor/generator MG2, a transmission output speed, a demand for operating the engine, a target speed of the engine, and related signals are input in a S101.

It is determined whether the position of the shift lever is neutral or parking state in a S102 and it is determined whether the speed of the output shaft of the transmission is larger than a predetermined value that EVT1 mode is changed to EVT2.

If the speed of the output shaft of the transmission is less than the predetermined value. S104 is performed and if the speed is larger than that, S106 is performed.

The speed of the first and second motor/generator (MG1 and 2) is controlled, that is, the MG1 and 2 are speed controlled to output a predetermined speed such that the speed of the second ring gear R2 is 0 on the speed diagram in the S104.

As described above, the torque of the engine (E) is controlled, that is, the engine (E) is torque controlled to output a predetermined torque.

The speed of the first and second motor/generator (MG1 and 2) is controlled, that is, the MG1 and 2 are speed controlled to output a predetermined speed such that the speed of the second ring gear R2 becomes equal to that of the engine in the speed diagram in the S106. As described above, the torque of the engine (E) is controlled to output a predetermined torque.

The second motor/generator MG2 is feedback or feed forward controlled to outputs a torque so as to achieve a predetermined speed in a S105 and S107.

Figure 7:
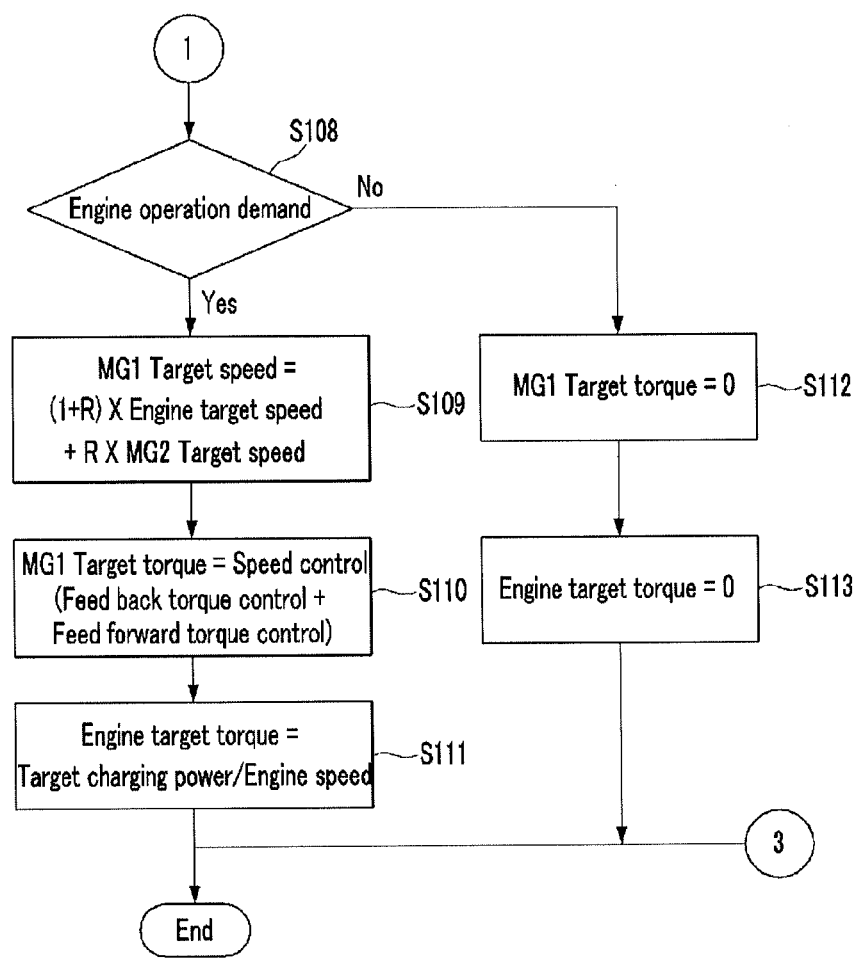

Referring to FIG. 7, if the engine (E) is demanded to operate in a S108, a S109 is performed and if the engine is not demanded to operate therein, a S112 is performed.

A target sped of the first motor/generator MG1 is calculated in a S109 and the first motor/generator MG1 is feedback or feedforward controlled to output a target torque so as to achieve a predetermined speed in a S110.

A target torque of the engine (E) is calculated by a predetermined formula in a S111.

A target torque of the first motor/generator MG1 is 0 in a S112 and a target torque of the engine (E) is controlled to output a Zero torque in a S113. In other words, the output torque of the engine is 0.

Figure 8:
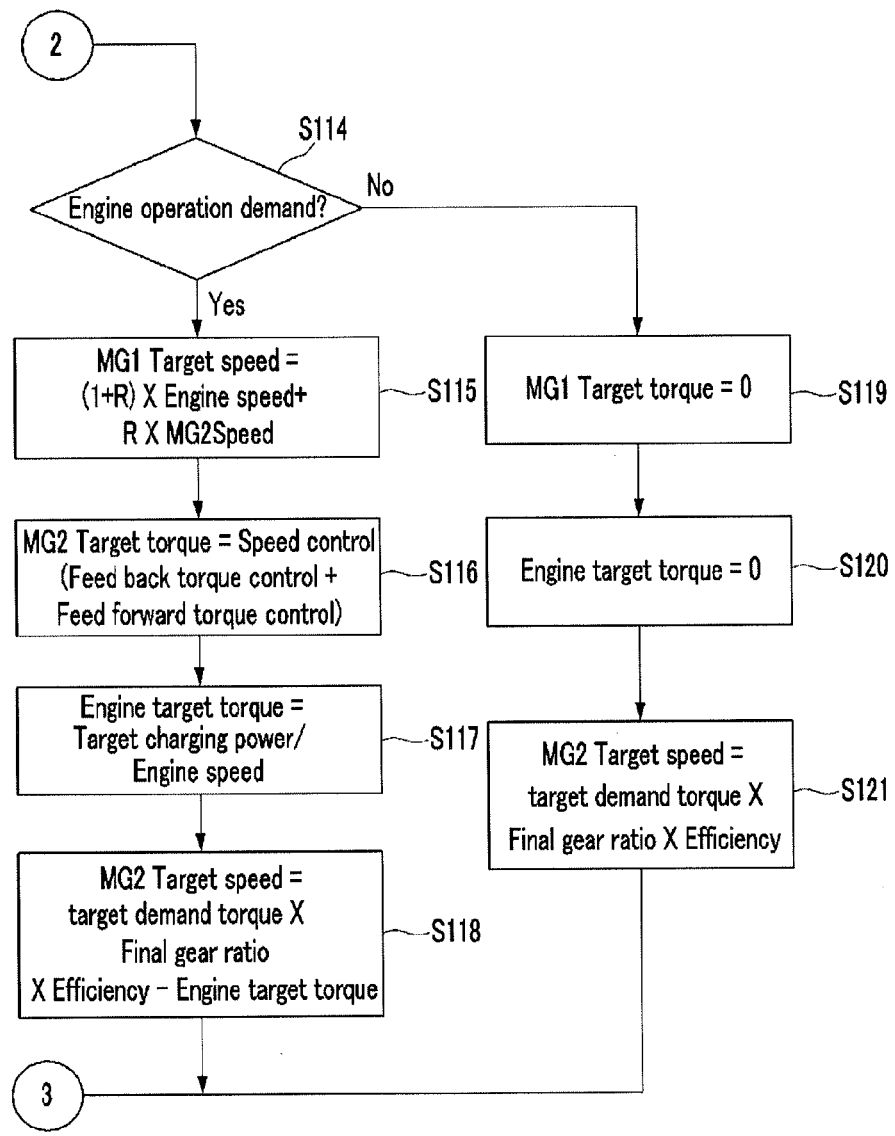

Referring to FIG. 8, if it is determined that the position of the shift lever is not neutral or parking but drive or reverse, a S114 is performed.

It is determined whether an operating of the engine (E) is demanded in the S114. If there is not an demand for the operation of the engine (E), a target torque of the first motor/generator MG1 is 0 in a S119, and a target torque of the engine (E) is 0 in a S120. In other words, the output torque is 0.

A target speed of the second motor/generator MG2 is calculated by multiplying a target torque, a final gear ratio, and efficiency thereof in a S121.

A target speed of the first motor/generator MG1 is calculated by a predetermined formula in the S115 and a target torque of the second motor/generator MG2 is feedback or feedforward controlled to achieve a speed thereof in the S116.

A target torque of the engine (E) is calculated by a predetermined formula in a S117 and a target speed of the second motor/generator MG2 is calculated by multiplying a target torque thereof, a final gear ratio, and efficiency and extracting a target torque of the engine from the multiplied value in a S118.

The EVT1 mode is performed in a case that the speed of the output shaft is less than a predetermined value, wherein the second brake BK2 is operated to stop the second ring gear R2 in various embodiments of the present invention.

The EVT2 mode is performed in a case that the speed of the output shaft is larger than a predetermined value, wherein the second clutch CL2 is operated such that the speed of the second ring gear R2 becomes equal to that of the engine (E). The detailed description for the EVT1 and EVT2 mode is omitted in various embodiments of the present invention.

In various embodiments of the present invention, the engine is torque controlled in a state that the shift lever for shifting is in the neutral or parking and the mode change becomes easier by using a speed control of the first and second motor/generator and the engine is continuously torque controlled such that the gear shifting quality and the driving performance is improved and the fuel is saved, while the transmission mode is changed to a drive or reverse from the neutral or parking or is changed to a neutral or parking from a drive or reverse.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A gear shifting method of a hybrid vehicle, comprising:
   determining that a shift is necessary;
   releasing a first clutch, a second clutch, a first brake, and a second brake of a transmission and determining whether or not a neutral condition is met;
   controlling torque of an engine connected to one operational element of a first planetary gear set in the neutral condition; and
   controlling speed of a first motor/generator connected to another operational element of the first planetary gear set, and a second motor/generator, completing the shift,
   wherein the first planetary gear set includes:
      a first sun gear;
      a first carrier to which the engine is coupled; and
      a first ring gear to which the first motor/generator is coupled;
   wherein the second planetary gear set includes:
      a second sun gear coupled to the first sun gear of the first planetary gear set by a shaft to which the second motor/generator is coupled; and
      a second ring gear;
   wherein the first clutch is selectively operated to engage the first ring gear and the first carrier;
   wherein the second clutch is selectively operated to engage the first carrier and the second ring gear;
   wherein the first brake selectively fixes the first ring gear; and
   wherein the second brake selectively fixes the second ring gear.

2. The gear shifting method of claim 1, wherein the second planetary gear set is disposed at one side of the first planetary gear set and a speed of the second motor/generator that is connected to one operational element of the second planetary gear set is controlled.

3. The gear shifting method of claim 2, wherein a torque of the engine is controlled, a speed of the first motor/generator is controlled, and a torque of the second motor/generator is controlled in a first electronic variable transmission mode (EVT1 mode) that the second ring gear of the second planetary gear set is fixed.

4. The gear shifting method of claim 2, wherein a torque of the engine is controlled, a speed of the first motor/generator is controlled, and a torque of the second motor/generator is controlled in a second electronic variable transmission mode (EVT2 mode) that a speed of the second ring gear of the second planetary gear set is controlled to be equal to that of the rotation speed of the engine.

\* \* \* \* \*